(12) United States Patent
Singh et al.

(10) Patent No.: US 12,050,512 B2
(45) Date of Patent: Jul. 30, 2024

(54) DYNAMIC CONFIGURATION OF REACTION POLICIES IN VIRTUALIZED FAULT MANAGEMENT SYSTEM

(71) Applicant: NXP B.V., Eindhoven (NL)

(72) Inventors: Shreya Singh, Ranchi (IN); Sandeep Kumar Arya, Bangalore (IN); Hemant Nautiyal, Greater Noida (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/879,653

(22) Filed: Aug. 2, 2022

(65) Prior Publication Data
US 2024/0045753 A1  Feb. 8, 2024

(51) Int. Cl.
*G06F 11/07* (2006.01)

(52) U.S. Cl.
CPC .......... *G06F 11/0793* (2013.01); *G06F 11/07* (2013.01); *G06F 11/0712* (2013.01)

(58) Field of Classification Search
CPC .. G06F 11/0793; G06F 11/0712; G06F 11/07; G06F 11/302; H04L 41/5074; H04L 41/0654

See application file for complete search history.

(56) References Cited

U.S. PATENT DOCUMENTS

| | | | | |
|---|---|---|---|---|
| 5,159,597 A | * | 10/1992 | Monahan | G06F 11/0793 714/E11.002 |
| 6,208,627 B1 | * | 3/2001 | Menon | G06Q 10/087 370/360 |
| 7,252,180 B2 | | 8/2007 | Deplazes et al. | |
| 8,886,179 B2 | | 11/2014 | Pathuri et al. | |
| 10,409,837 B1 | * | 9/2019 | Schmidt | G06F 16/2379 |
| 10,592,270 B2 | | 3/2020 | Brewerton et al. | |
| 11,140,030 B2 | | 10/2021 | Bursell | |
| 11,334,409 B2 | | 5/2022 | Nautiyal et al. | |
| 2003/0084057 A1 | * | 5/2003 | Balogh | G06F 16/2365 |
| 2006/0143515 A1 | * | 6/2006 | Kuramkote | G06F 11/0793 714/15 |
| 2009/0158099 A1 | * | 6/2009 | Cui | G06F 11/0778 714/57 |
| 2011/0126051 A1 | * | 5/2011 | Flautner | G06F 11/167 714/30 |
| 2015/0378762 A1 | | 12/2015 | Saladi et al. | |
| 2017/0083391 A1 | | 3/2017 | Robertson et al. | |
| 2017/0315879 A1 | * | 11/2017 | Park | G06F 11/0766 |
| 2018/0067866 A1 | * | 3/2018 | Shanbhogue | G06F 11/0787 |
| 2018/0095814 A1 | * | 4/2018 | Patil | G06F 11/0769 |
| 2019/0278651 A1 | * | 9/2019 | Thornley | G06F 11/0787 |
| 2020/0150991 A1 | | 5/2020 | Ganti et al. | |

* cited by examiner

*Primary Examiner* — Yolanda L Wilson

(57) ABSTRACT

A method of dynamic configuration of reaction policies in virtualized fault management system includes disabling a fault handler circuit comprising a reaction core in response to receiving a request to modify a respective first reaction policy including a plurality of first recovery actions of the reaction core, wherein each of the first recovery actions is responsive to a respective fault indication. At least one event status is cleared from an event table of the fault handler circuit. The at least one event status is set in response to the fault handler circuit receiving the respective fault indication. The reaction core is configured with a second reaction policy including a plurality of second recovery actions.

17 Claims, 5 Drawing Sheets

DYNAMIC CONFIGURATION OF REACTION POLICIES IN VIRTUALIZED FAULT MANAGEMENT SYSTEM

FIELD

This disclosure relates generally to fault management in electronic systems, and more specifically to dynamic reaction reconfiguration to improve fault management and system availability.

BACKGROUND

Electronic systems with high levels of integration often have numerous processor cores running one or more applications. Each of these applications may interact with one or more resources. For example, an automotive system may include an anti-lock braking application that interacts with clocking circuitry, accelerometers, memories or other resources. Furthermore, several applications may depend on a common resource, on the operating status of another application or on the system itself in determining how to respond to a fault.

Traditionally, systems have been required to be shut down or rebooted to modify an application response to a fault, thus significantly reducing system availability. In this interdependent and dynamic environment, it is desirable to be able to seamlessly modify an application response to a fault with minimal disruption to the operation of the other applications or resources.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for dynamic configuration of reaction polices specific to one or more fault handlers, without impacting the operation of the remaining fault handlers. Each fault handler is identified by an FHID and is chosen based on an assignment of the FHID to at least one application running on a processor. Each application is identified by a Domain Identification (D_ID). When a fault is detected from an application, a Fault Indication (FI) and the D_ID are transmitted to a fault management system. The D_ID is used to determine a fault handler including a reaction core, and the FI is used to determine a reaction combination specific to the reaction core. The reaction core mimics at least some of the functionality of the respective application do determine how the fault impacts the application and how best to respond to, and recover, from the fault. Examples of reaction combinations include, but are not limited to, issuing an Interrupt Request (IRQ), issuing a Non Maskable Interrupt (NMI), entering a Safe State (SAFE_STATE) to suspend communication with the faulty logic prompting the fault, issuing an Error Out flag (EOUT) and the like.

During the operation of a system with multiple applications, the reaction combination (e.g., reaction policy) may need to be updated without suspending or otherwise affecting the remaining applications. In one example, a change to the reaction combination may be required due to a general maintenance update to implement an improve reaction. In another example, the reaction combination may be updated to reflect a new context for the application. For example, the context of an automotive application may change depending on the speed of a vehicle whether the vehicle is parked, or whether the vehicle is operating in a high security area. The context may be based on system operation, or whether the system is booting or in a low power mode. The FHID specific reaction combination is only allowed to be updated after all pending fault events (indicated by their respective FI) are dispatched and resolved. During the update to the FHID specific reaction combination, new fault events associated with the FHID being updated, are stored for future resolution with the new reaction combination.

Figure 1:
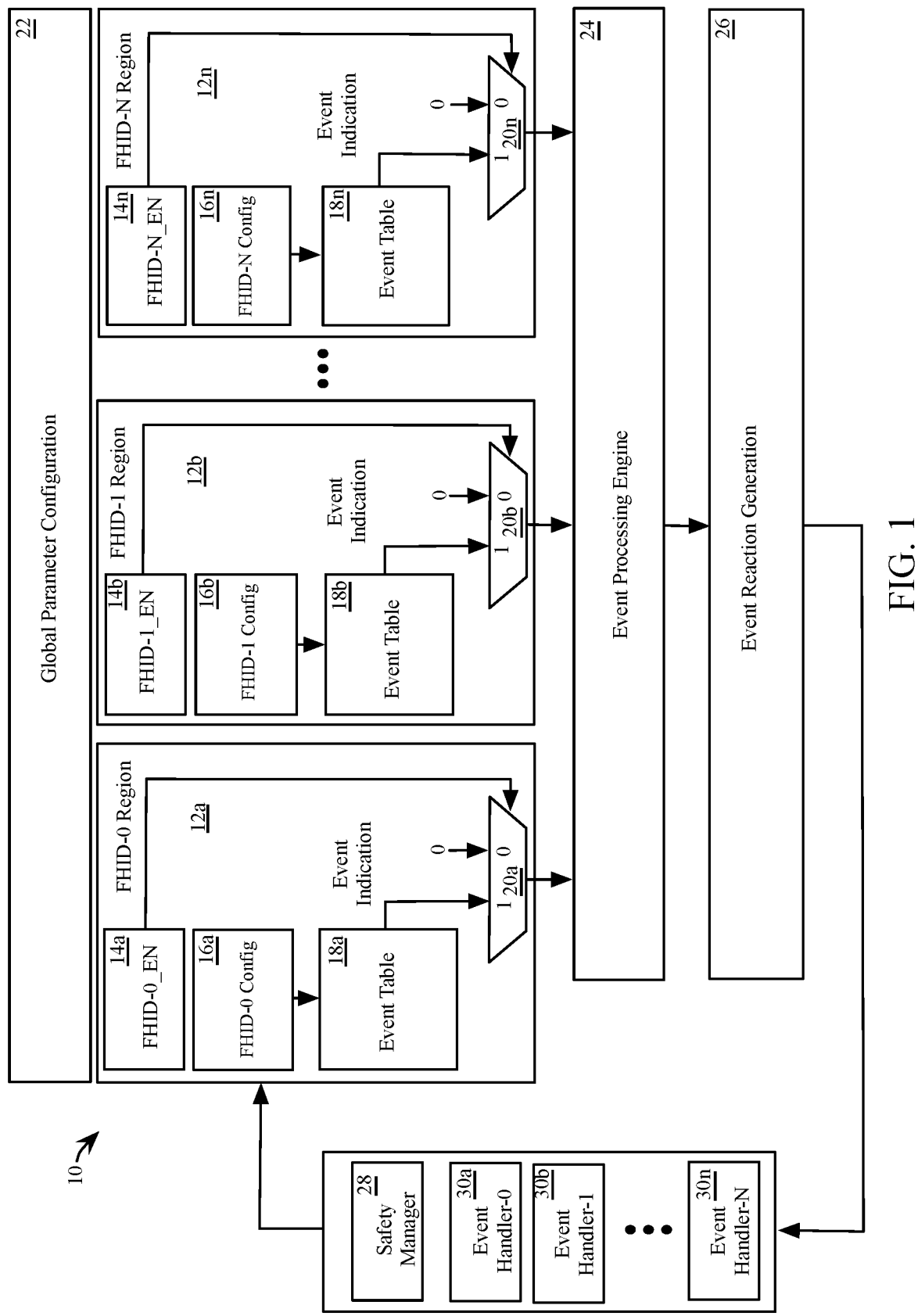
FIG. 1 is a functional block view of a system for dynamic configuration of reaction policies, in accordance with an embodiment of the present disclosure.

FIG. 1 shows an embodiment 10 of a system for dynamic configuration of reaction policies. The embodiment 10 is responsive to one or more fault indications received by a processor (not shown) running at least one application. Each application may interact with a resource (not shown), which may result in a fault event triggering the fault indication. The embodiment 10 includes a plurality of fault handlers 12a, 12b through 12n (generally 12), also referred to as FHID-0, FHID-1 and FHID-N regions respectively. Each fault handler 12 includes a respective FHID enable circuit 14a, 14b through 14n (generally 14), a respective FHID configuration circuit 16a, 16b through 16n (generally 16), a respective event table 18a, 18b through 18n (generally 18) and a respective multiplexer 20a, 20b through 20n (generally 20).

Within each fault handler 12, the FHID enable circuit 14 enables or disables the respective fault handler 12 including the processing of reactions to any pending faults associated with the respective FHID 12. The FHID configuration circuit 16 of each fault handler 12 provides fault level enabling or disabling and configuration of a respective reaction combination. The event table 18 stores fault events to be handled by the reaction combination of the fault handler 12. When the fault handler 12 is disabled (for example to update a reaction combination), the multiplexer 20 prevents fault events from the respective fault handler 12 from being processed.

A global parameter configuration circuit 22 configures generic parameters common to each of the fault handlers 12. Generic parameters may include, without limit, a polarity of each fault event, a fault detection sensitivity, a nature of a fault event, a look-up table (LUT) mapping a D_ID to a reaction core of a respective fault handler 12 and for each reaction core, a LUT mapping fault events to reaction combinations. In one example, the global parameter configuration circuit 22 is configured by a hypervisor.

When reaction combinations are not being configured, each FHID enable circuit 14 will enable the respective multiplexer 20, so that fault events from the respective event tables 18 are received by the event processing engine circuit 24. The event reaction generation circuit 26 aggregates the reactions of each fault handler 12 to respective fault events from each application to be handled by a safety manager 28. The safety manager 28 controls and coordinates a plurality of event handlers 30a, 30b through 30n (generally 30), each assigned to a respective reaction to a fault event received by the event reaction generation circuit 26. In one embodiment, the safety manager and event handlers 30 are implemented in software, while the remainder of the embodiment 10 is implemented in hardware.

Figure 2:
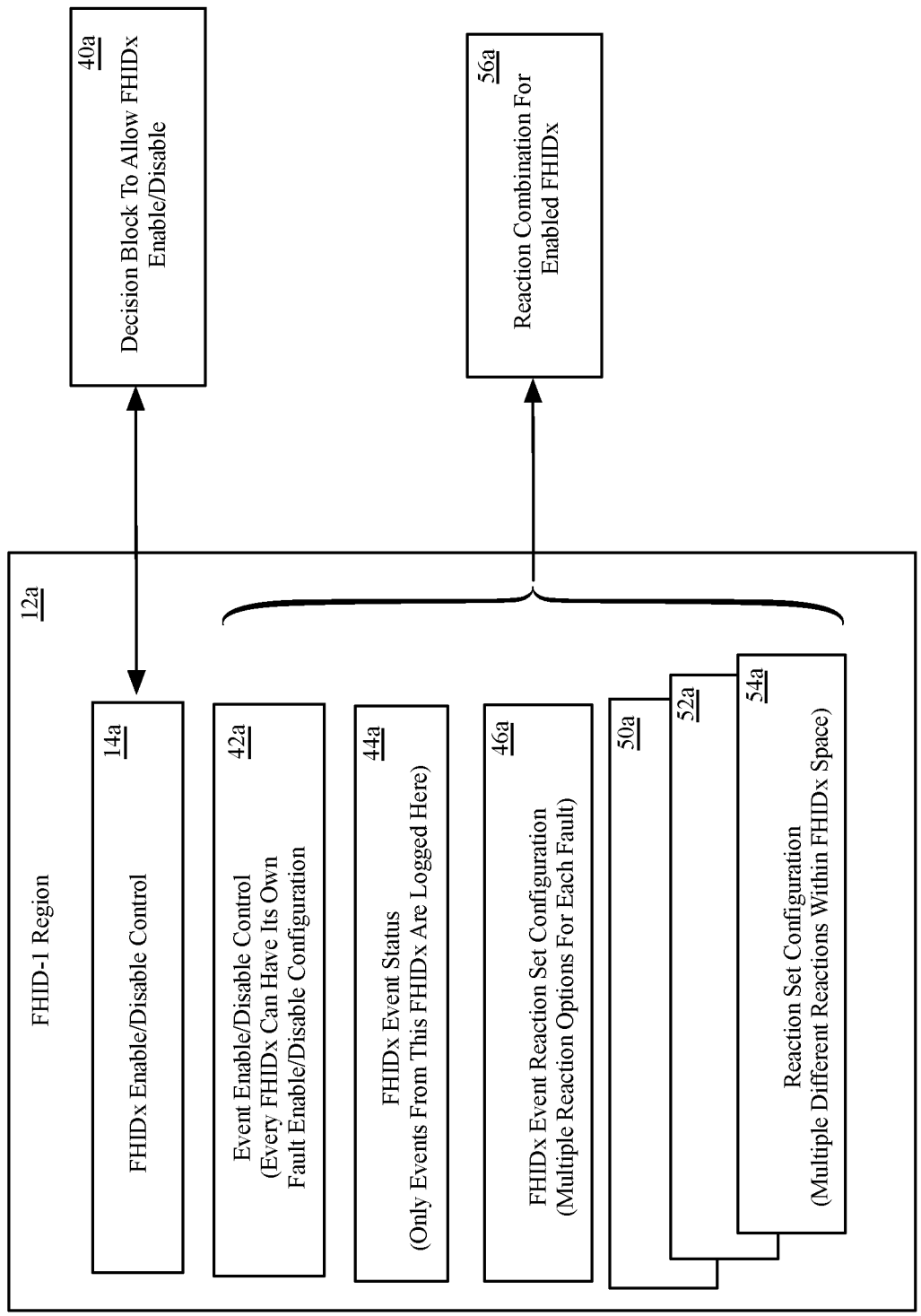
FIG. 2 is a functional block view of the Fault Handler Identifier (FHID) region of FIG. 1, in accordance with an embodiment of the present disclosure.

FIG. 2 with continued reference to FIG. 1 shows a functional block view of the fault handler 12a (representative of each of the fault handlers 12). The FHID enable circuit 14a is gated by a decision block 40a further described in FIG. 3. After pending fault events are cleared and the fault handler is disabled with the FHID enable circuit 14a, at least one reaction configuration may be updated. In one example, a fault event control register 42a is also updated to provide enable or disable control over the reaction to each fault event once the reaction reconfiguration is completed and the fault handler 12 is reenabled. In another example, the fault control register 42a is updated following the reenabling of the fault handler 12.

Fault events received during the update to one or more of the reaction configurations of the fault handler 12 are logged with an event status circuit 44a equivalent to the vent table 18a of FIG. 1. A reaction configuration may be updated with the event reaction set configuration circuit 46a specific to one reaction core and fault event type and similarly for other reaction configurations specific to other reaction cores (associated with specific D_IDs) and fault event types for the respective fault handler 12a. The circuits 42a, 44a, 46a, 50a, 52a and 54a are all used to update the reaction combination shown as a collection action 56a.

Figure 3:
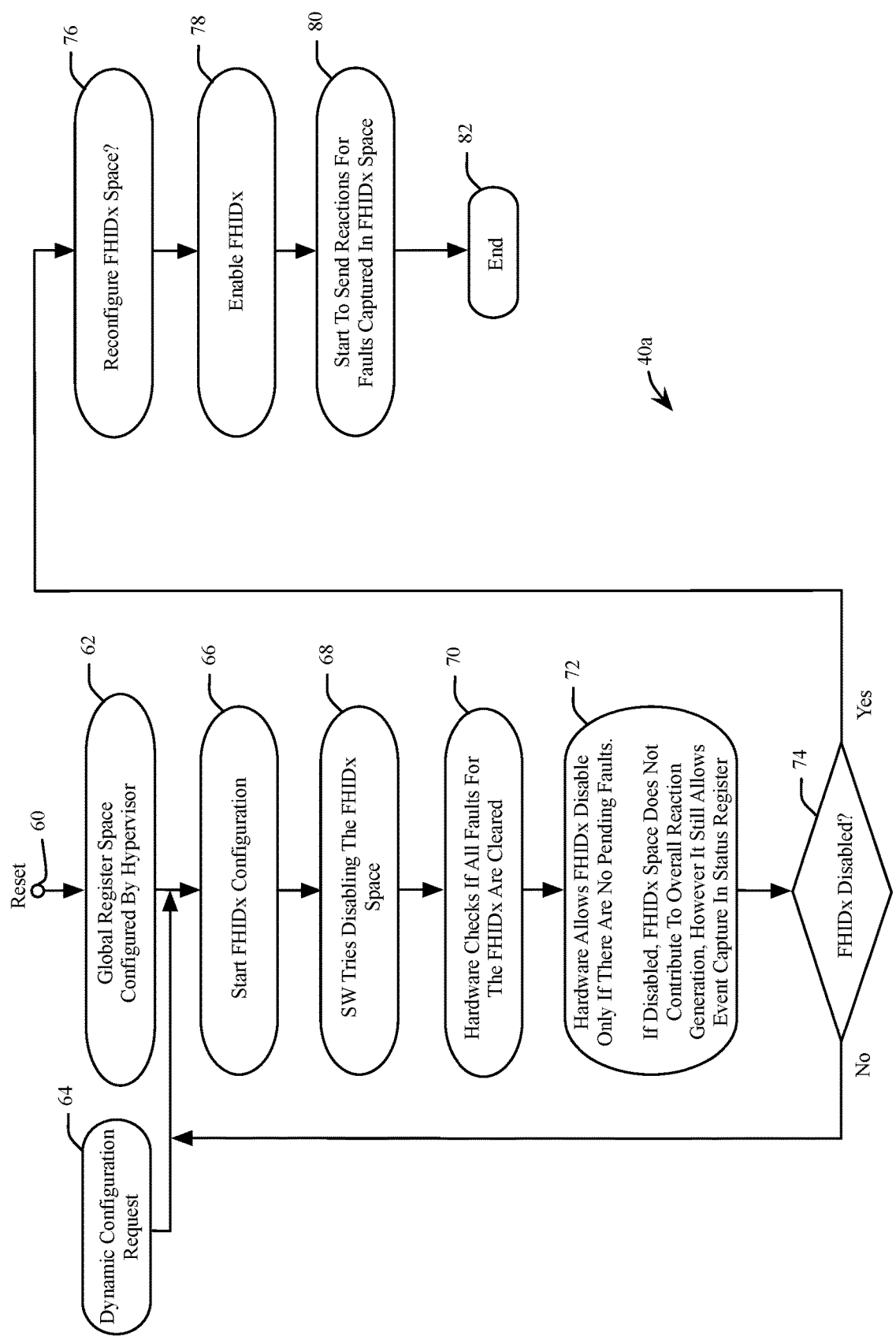
FIG. 3 is a flowchart representation of a method for dynamic configuration of reaction policies in virtualized fault management system, in accordance with an embodiment of the present disclosure.

FIG. 3, with continued reference to FIG. 1 and FIG. 2, shows a flowchart representation of the decision block 40a of FIG. 2 used for dynamic configuration of the reaction policies of a fault handler 12. In one example, after the embodiment of FIG. 1 exits reset at 60, the global parameter configuration circuit 22 is configured by a hypervisor at 62. At 64, a request may be made to update one or reaction combinations. At 66, a reconfiguration of a fault handler 12 is initiated. At 68, a software program attempts to disable the fault handler 12. At 70, a hardware circuit determines if all pending fault events mapped to the fault handler 12 are cleared. In one example at 72, a hardware gatekeeper circuit prevents the FHID enable circuit 14 from being disabled by a software routine until all pending faults are cleared.

While the fault handler 12 is disabled, future fault events are logged in the event table 18 (see FIG. 1) however these fault events do not contribute to the overall event reaction generation by the event reaction generation circuit 26. At 74, if the fault handler 12 is not disabled, then the process returns to 66. Otherwise, the fault handler is reconfigured at 76 by modifying one or more reaction combinations. At 78, the fault handler 12 is reenabled. At 80, the fault handler 12 starts to resend reactions to the event handlers 30, that were logged in the event table 18 during the reconfiguration of the fault handler 12. At 82, the process of dynamic configuration ends.

Figure 4:
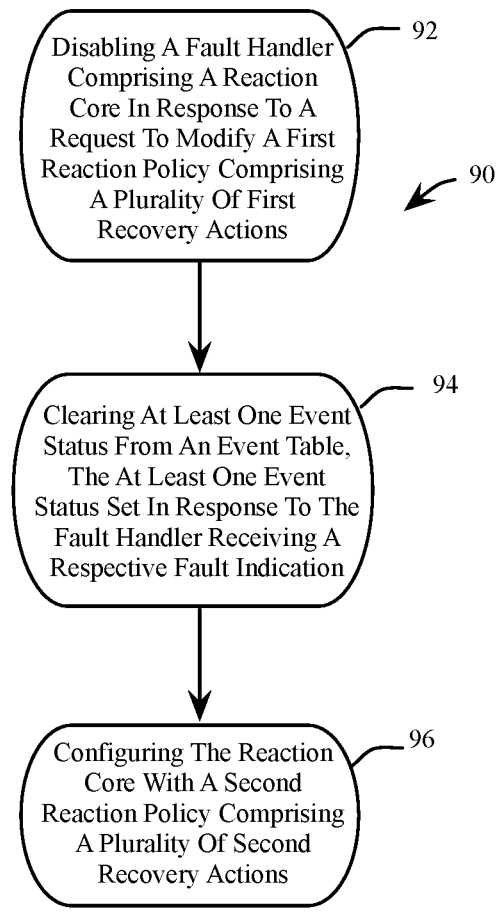
FIG. 4 is a flowchart representation of another method for dynamic configuration of reaction policies in virtualized fault management system, in accordance with an embodiment of the present disclosure.

FIG. 4 shows an embodiment 90 of a method for dynamic configuration of reaction polices in virtualized fault management system. With continued reference to FIG. 1, at 92, a fault handler 12 including a reaction core is disabled 72 in response to a request 64 to modify a first reaction policy. At 94, at least one event status is cleared from an event table 18 of the fault handler 12, wherein the at least one event status is set in response to the fault handler receiving a respective fault indication. At 96, the reaction core is configured with a second reaction policy (e.g., the reaction policy is reconfigured).

Figure 5:
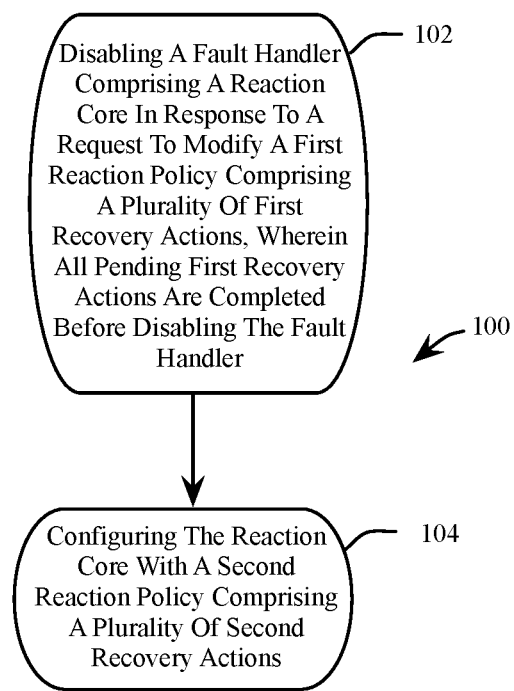
FIG. 5 is a flowchart representation of another method for dynamic configuration of reaction policies in virtualized fault management system, in accordance with an embodiment of the present disclosure.

FIG. 5 shows an embodiment 100 of a method for dynamic configuration of reaction polices in virtualized fault management system. With continued reference to FIG. 1, at 102, a fault handler 12 comprising a reaction core is disabled 72 in response to a request 64 to modify a first reaction policy, wherein all pending first recovery actions are completed before disabling the fault handler 12. At 104, the reaction core is configured with a second reaction policy (e.g., the reaction policy is reconfigured).

As will be appreciated, at least some of the embodiments as disclosed include at least the following. In one embodiment, a method of dynamic configuration of reaction policies in virtualized fault management system comprises disabling a fault handler circuit comprising a reaction core in response to receiving a request to modify a respective first reaction policy comprising a plurality of first recovery actions of the reaction core, wherein each of the first recovery actions is responsive to a respective fault indication. At least one event status is cleared from an event table of the fault handler circuit, the at least one event status set in response to the fault handler circuit receiving the respective fault indication. The reaction core is configured with a second reaction policy comprising a plurality of second recovery actions.

Alternative embodiments of the method of dynamic configuration of reaction policies in virtualized fault management system comprising one of the following features, or any combination thereof. All pending first recovery actions are completed before disabling the fault handler circuit. Fault indications generated while the fault handler circuit is disabled are stored. At least one of the second recovery actions depends on a change in context of an application running on a processor core from which a respective fault indication is generated. At least one of the first recovery actions depends on a time delay measured from receiving a fault indication by the fault handler circuit and to resetting the fault indication. The fault handler circuit is selected from a mapping of a Fault Handler Identification (FHID) of the fault handler circuit to a Domain identification (D_ID) of an application generating the respective fault indication. The fault handler circuit is one of a plurality of fault handler circuits, and less than all of the plurality of fault handler circuits are disabled in response to receiving the request to modify the respective first reaction policy. The FHID is mapped to more than one D_ID.

In another embodiment, an apparatus comprises a fault handler circuit comprising a reaction core, wherein the fault handler circuit is configured to respond to a request to modify a respective first reaction policy comprising a plurality of first recovery actions of the reaction core, and each of the first recovery actions is responsive to a respective fault indication. A processor is configured to generate the respective fault indication, in response to a fault event of an application running on the processor. A safety manager is configured to respond to a request to modify the respective first reaction policy, to disable the fault handler circuit in response to the request and to configure the reaction core with a second reaction policy comprising a plurality of second recovery actions.

Alternative embodiments of the apparatus include one of the following features, or any combination thereof. The safety manager is configured to disable at least one fault event control of the reaction core, the at least one fault event control configured to prevent the reaction core from responding to the respective one of the fault indications. At least one event status is cleared from an event table of the fault handler circuit, the at least one event status set in response to the fault handler circuit receiving the respective fault indication. The safety manager is configured to verify the completion of all pending first recovery actions by the reaction core before disabling the fault handler circuit. A memory is configured to store fault indications generated by the processor while the fault handler circuit is disabled. A global configuration circuit is configured to map a Fault Handler Identification (FHID) of the fault handler circuit to a Domain identification (D_ID) of at least one application generating the respective fault indication. The fault handler circuit is one of a plurality of fault handler circuits, and less than all of the plurality of fault handler circuits are disabled in response to receiving the request to modify the respective first reaction policy.

In another embodiment, a method of dynamic configuration of reaction policies in virtualized fault management system comprises disabling a fault handler circuit comprising a reaction core in response to receiving a request to modify a respective first reaction policy comprising a plurality of first recovery actions of the reaction core, wherein each of the first recovery actions is responsive to a respective fault indication and all pending first recovery actions are completed before disabling the fault handler circuit. The reaction core is configured with a second reaction policy comprising a plurality of second recovery actions.

Alternative embodiments of the method of dynamic configuration of reaction policies in virtualized fault management system include one of the following features, or any combination thereof. At least one event status is cleared from an event table of the fault handler circuit, the at least one event status set in response to the fault handler circuit receiving the respective fault indication. Fault indications generated while the fault handler circuit is disabled are stored. The fault handler circuit is selected from a mapping of a Fault Handler Identification (FHID) of the fault handler circuit to a Domain identification (D_ID) of an application generating the respective fault indication. The reaction core duplicates at least one function of an application running on the processor. At least one of the second recovery actions of the second reaction policy differs from the respective one of the first recovery actions of the first reaction policy.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of dynamic configuration of reaction policies in virtualized fault management system comprising:
    disabling a fault handler circuit comprising a reaction core in response to receiving a request to modify a respective first reaction policy comprising a plurality of first recovery actions of the reaction core, wherein each of the first recovery actions is responsive to a respective fault indication;
    clearing at least one event status from an event table of the fault handler circuit, the at least one event status set in response to the fault handler circuit receiving the respective fault indication;
    storing fault indications generated while the fault handler circuit is disabled; and
    configuring the reaction core with a second reaction policy comprising a plurality of second recovery actions.

2. The method of claim 1 further comprising completing all pending first recovery actions before disabling the fault handler circuit.

3. The method of claim 1 wherein at least one of the second recovery actions depends on a change in context of an application running on a processor core from which a respective fault indication is generated.

4. A method of dynamic configuration of reaction policies in virtualized fault management system comprising:
    disabling a fault handler circuit comprising a reaction core in response to receiving a request to modify a respective first reaction policy comprising a plurality of first recovery actions of the reaction core, wherein each of the first recovery actions is responsive to a respective fault indication;
    clearing at least one event status from an event table of the fault handler circuit, the at least one event status set in response to the fault handler circuit receiving the respective fault indication; and
    configuring the reaction core with a second reaction policy comprising a plurality of second recovery actions,
    wherein at least one of the first recovery actions depends on a time delay measured from receiving a fault indication by the fault handler circuit and to resetting the fault indication.

5. A method of dynamic configuration of reaction policies in virtualized fault management system comprising:
    disabling a fault handler circuit comprising a reaction core in response to receiving a request to modify a respective first reaction policy comprising a plurality of first recovery actions of the reaction core, wherein each of the first recovery actions is responsive to a respective fault indication;
    clearing at least one event status from an event table of the fault handler circuit, the at least one event status set in response to the fault handler circuit receiving the respective fault indication; and
    configuring the reaction core with a second reaction policy comprising a plurality of second recovery actions,
    wherein the method further comprises selecting the fault handler circuit from a mapping of a Fault Handler Identification (FHID) of the fault handler circuit to a Domain identification (D_ID) of an application generating the respective fault indication.

6. The method of claim 5 wherein the fault handler circuit is one of a plurality of fault handler circuits, and less than all of the plurality of fault handler circuits are disabled in response to receiving the request to modify the respective first reaction policy.

7. The method of claim 5 wherein the FHID is mapped to more than one D_ID.

8. An apparatus comprising:
a fault handler circuit comprising a reaction core, wherein the fault handler circuit is configured to respond to a request to modify a respective first reaction policy comprising a plurality of first recovery actions of the reaction core, and each of the first recovery actions is responsive to a respective fault indication;
a processor configured to generate the respective fault indication, in response to a fault event of an application running on the processor; and
a safety manager configured to respond to a request to modify the respective first reaction policy, to disable the fault handler circuit in response to the request and to configure the reaction core with a second reaction policy comprising a plurality of second recovery actions,
wherein the safety manager is configured to:
clear at least one event status from an event table of the fault handler circuit, the at least one event status set in response to the fault handler circuit receiving the respective fault indication, and
verify the completion of all pending first recovery actions by the reaction core before disabling the fault handler circuit.

9. An apparatus comprising:
a fault handler circuit comprising a reaction core, wherein the fault handler circuit is configured to respond to a request to modify a respective first reaction policy comprising a plurality of first recovery actions of the reaction core, and each of the first recovery actions is responsive to a respective fault indication;
a processor configured to generate the respective fault indication, in response to a fault event of an application running on the processor;
a safety manager configured to respond to a request to modify the respective first reaction policy, to disable the fault handler circuit in response to the request and to configure the reaction core with a second reaction policy comprising a plurality of second recovery actions; and
a memory configured to store fault indications generated by the processor while the fault handler circuit is disabled.

10. An apparatus comprising:
a fault handler circuit comprising a reaction core, wherein the fault handler circuit is configured to respond to a request to modify a respective first reaction policy comprising a plurality of first recovery actions of the reaction core, and each of the first recovery actions is responsive to a respective fault indication;
a processor configured to generate the respective fault indication, in response to a fault event of an application running on the processor;
a safety manager configured to respond to a request to modify the respective first reaction policy, to disable the fault handler circuit in response to the request and to configure the reaction core with a second reaction policy comprising a plurality of second recovery actions; and
a global configuration circuit configured to map a Fault Handler Identification (FHID) of the fault handler circuit to a Domain identification (D_ID) of at least one application generating the respective fault indication.

11. An apparatus comprising:
a fault handler circuit comprising a reaction core, wherein the fault handler circuit is configured to respond to a request to modify a respective first reaction policy comprising a plurality of first recovery actions of the reaction core, and each of the first recovery actions is responsive to a respective fault indication;
a processor configured to generate the respective fault indication, in response to a fault event of an application running on the processor; and
a safety manager configured to respond to a request to modify the respective first reaction policy, to disable the fault handler circuit in response to the request and to configure the reaction core with a second reaction policy comprising a plurality of second recovery actions,
wherein the fault handler circuit is one of a plurality of fault handler circuits, and less than all of the plurality of fault handler circuits are disabled in response to receiving the request to modify the respective first reaction policy.

12. A method of dynamic configuration of reaction policies in virtualized fault management system comprising:
disabling a fault handler circuit comprising a reaction core in response to receiving a request to modify a respective first reaction policy comprising a plurality of first recovery actions of the reaction core, wherein each of the first recovery actions is responsive to a respective fault indication and all pending first recovery actions are completed before disabling the fault handler circuit; and
configuring the reaction core with a second reaction policy comprising a plurality of second recovery actions.

13. The method of claim 12 further comprising clearing at least one event status from an event table of the fault handler circuit, the at least one even status set in response to the fault handler circuit receiving the respective fault indication.

14. The method of claim 12 further comprising storing fault indications generated while the fault handler circuit is disabled.

15. The method of claim 12 further comprising selecting the fault handler circuit from a mapping of a Fault Handler Identification (FHID) of the fault handler circuit to a Domain identification (D_ID) of an application generating the respective fault indication.

16. The method of claim 15 wherein the reaction core duplicates at least one function of an application running on the processor.

17. The method of claim 12 wherein at least one of the second recovery actions of the second reaction policy differs from the respective one of the first recovery actions of the first reaction policy.

* * * * *